United States Patent
Wellington et al.

[11] Patent Number: 5,899,269
[45] Date of Patent: May 4, 1999

[54] FLAMELESS COMBUSTOR

[75] Inventors: Scott Lee Wellington; Thomas Mikus; Harold J. Vinegar; John Michael Karanikas, all of Houston, Tex.

[73] Assignee: Shell Oil Company, Houston, Tex.

[21] Appl. No.: 08/774,168

[22] Filed: Dec. 26, 1996

Related U.S. Application Data

[60] Provisional application No. 60/009,345, Dec. 27, 1995.

[51] Int. Cl.⁶ .............................. B01J 8/00; E21B 36/04
[52] U.S. Cl. .............................. 166/58; 166/59; 166/60; 166/61; 166/64; 166/72; 422/174; 422/177; 423/245.3; 431/7; 431/268; 431/328
[58] Field of Search .............................. 166/58–61, 64, 166/72; 422/174, 177; 423/245.3; 431/7, 170, 268, 328

[56] References Cited

U.S. PATENT DOCUMENTS

| | | | |
|---|---|---|---|
| Re. 35,696 | 12/1997 | Mikus | 166/59 X |
| 3,507,332 | 4/1970 | Venable et al. | 166/292 |
| 3,680,635 | 8/1972 | Berry et al. | 166/59 X |
| 3,680,636 | 8/1972 | Berry et al. | 166/59 X |
| 3,713,482 | 1/1973 | Lichte et al. | 166/59 |
| 3,780,803 | 12/1973 | Hardy et al. | 166/59 |
| 3,804,163 | 4/1974 | Bradley et al. | 166/59 |
| 3,817,332 | 6/1974 | Berry et al. | 166/302 |
| 3,880,235 | 4/1975 | Berry et al. | 166/59 X |
| 3,928,961 | 12/1975 | Pfefferle | 60/39.02 |
| 4,065,917 | 1/1978 | Pfefferle | 60/39.82 |
| 4,237,973 | 12/1980 | Todd | 166/59 |
| 4,377,205 | 3/1983 | Retallick | 166/59 |
| 4,445,570 | 5/1984 | Retallick | 166/59 |
| 4,640,352 | 2/1987 | Vanmeurs et al. | 166/245 |
| 4,706,751 | 11/1987 | Gondouin | 166/272 |
| 4,886,118 | 12/1989 | Van Meurs et al. | 166/245 |
| 5,255,742 | 10/1993 | Mikus | 166/303 |
| 5,355,668 | 10/1994 | Weil et al. | 60/39.06 |
| 5,404,952 | 4/1995 | Vinegar et al. | 166/303 |

FOREIGN PATENT DOCUMENTS 0 072 675  2/1983  European Pat. Off. .

OTHER PUBLICATIONS

International Search Report dated Apr. 11, 1997.

*Primary Examiner*—Roger Schoeppel

[57] ABSTRACT

A combustor method and apparatus is provided. The method utilizes flameless combustion with one or more of three improvements to enhance ignition of the flameless combustor. A catalytic surface can be provided within a combustion chamber to provide flameless combustion at least in the vicinity of the catalytic surface at a temperature that is much lower than the autoignition temperature of fuel in air without the presence of the catalytic surface. Nitrous oxide or supplemental oxygen may also be used as an oxidant either instead of air or with air to reduce ignition temperatures. Further, electrical energy can be passed through the fuel conduit, raising the temperature of the conduit to a temperature above which the fuel will ignite when combined with the oxidant.

9 Claims, 2 Drawing Sheets

5,899,269

FLAMELESS COMBUSTOR

This is a provisional application Ser. No. 60/009,345 filed Dec. 27, 1995.

FIELD OF THE INVENTION

This invention relates to a combustor apparatus and method.

BACKGROUND TO THE INVENTION

U.S. Pat. Nos. 4,640,352 and 4,886,118 disclose conductive heating of subterranean formations of low permeability that contain oil to recover oil therefrom. Low permeability formations include diatomites, lipid coals, tar sands, and oil shales. Formations of low permeability are not amiable to enhanced oil recovery methods such as steam, carbon dioxide, or fire flooding. Flooding materials tend to penetrate formations that have low permeabilities preferentially through fractures. The injected materials bypass most of the formation hydrocarbons. In contrast, conductive heating does not require fluid transport into the formation. Oil within the formation is therefore not bypassed as in a flooding process. When the temperature of a formation is increased by conductive heating, vertical temperature profiles will tend to be relatively uniform because formations generally have relatively uniform thermal conductivities and specific heats. Transportation of hydrocarbons in a thermal conduction process is by pressure drive, vaporization, and thermal expansion of oil and water trapped within the pores of the formation rock. Hydrocarbons migrate through small fractures created by thermal stress and by the expansion and vaporization of the oil and water.

U.S. Pat. Nos. 3,113,623 and 3,181,613 disclose gas fired heat injection burners for heating subterranean formations. These burners utilize porous materials to hold a flame and thereby spreading the flame out over an extended length. Radiant heat transfer from a flame to the casing is avoided by providing the porous medium to hold the flame. But for combustion to take place in the porous medium, the fuel gas and the combustion air must be premixed. If the premixed fuel gas and combustion air were at a temperature above the autoignition temperature of the mixture, they would react upon being premixed instead of within the porous medium. The formations utilized as examples of these inventions are only up to fifty feet thick and below only about fifteen feet of overburden. The fuel gas and the combustion air are therefore relatively cool when they reach the burner. The burner would not function as it was intended if the formation being heated were significantly deeper.

U.S. Pat. No. 5,255,742 discloses a flameless combustor useful for heating subterranean formations that utilizes preheated fuel gas and/or combustion air wherein the fuel gas is combined with the combustion air in increments that are sufficiently small that flames are avoided. Creation of $NO_x$ is almost eliminated, and cost of the heaters can be significantly reduced because of less expensive materials of construction. Preheating the fuel gas according to the invention of patent '742 results in coke formation unless $CO_2$, $H_2$, steam, or some other coke suppressant is added to the fuel gas. Further, start-up of the heater of patent '742 is a time consuming process because it must operate at temperatures above the autoignition temperature of the fuel gas mixture. Start-up requires long periods of very low flow-rate operation before temperatures would be sufficiently high for normal operation.

Catalytic combustors are also known. For example, U.S. Pat. No. 3,928,961 discloses a catalytically-supported thermal combustion apparatus wherein formation of $NO_x$ is eliminated by combustion at temperatures above autoignition temperatures of the fuel, but less than those temperatures at which result in substantial formation of oxides of nitrogen.

Metal surfaces coated with oxidation catalyst are disclosed in, for example, U.S. Pat. Nos. 5,355,668 and 4,065,917. These patents suggest catalytic coated surfaces on components of a gas turbine engine. Patent '917 suggests use of catalytic coated surfaces for start-up of the turbine, and suggests a mass transfer control limited phase in the start-up operation.

It is therefore an object of the present invention to provide a combustion method and apparatus which is flameless, and can be easily ignited and brought up to operating temperatures. In another aspect of the present invention, it is an object to provide a combustion method and apparatus wherein formation of $NO_x$ is minimal. It is another object of the present invention to provide a method which has a high level of thermal efficiency.

SUMMARY OF THE INVENTION

The method of the present invention utilizes flameless combustion with one or more of three improvements to enhance ignition of the flameless combustor. A catalytic surface can be provided within a combustion chamber to provide flameless combustion at least in the vicinity of the catalytic surface at a temperature that is much lower than the autoignition temperature of fuel in air without the presence of the noble metal surface. Nitrous oxide or supplemental oxygen may also be used as an oxidant either instead of air or with air to further reduce ignition temperatures. Fuels with lower ignition temperatures, for example, hydrogen or hydrogen/carbon monoxide mixture, may also be used to reduce ignition temperatures. Further, electrical energy can be passed through the fuel conduit, raising the temperature of the conduit to a temperature at which the fuel will ignite.

The flameless combustion of the present invention also results in minimal production of nitrous oxides. Other measures to remove or prevent the formation of nitrous oxides are therefore not required.

DETAILED DESCRIPTION OF THE INVENTION

A flameless combustor that can be utilized with improvement, according to the present invention, is disclosed in U.S. Pat. No. 5,255,742, the disclosure of which is incorporated herein by reference. The improvements of the present invention include three improvements related to the start-up of such a combustor. The three improvements may be used individually, but are preferably used in combination with at least two utilized. The three improvements of the present invention include: use of the fuel gas conduit as a resistance heater to provide heat for start-up; use of a catalytic surface within the combustion chamber to lower temperatures at which oxidation of the fuel will occur; and use of oxidants other than air, or along with air, to lower autoignition temperatures during start-up.

An important feature of the flameless combustor of the present invention is that heat is removed along the axis of the combustion chamber so that a temperature is maintained that is significantly below what an adiabatic combustion temperature would be. This almost eliminates formation of $NO_x$s, and also significantly reduces metallurgical requirements resulting in a relatively inexpensive combustor.

Generally, flameless combustion is accomplished by preheating combustion air and fuel gas sufficiently that when the two streams are combined the temperature of the mixture exceeds the autoignition temperature of the mixture, but to a temperature less than that which would result in the oxidation upon mixing being limited by the rate of mixing. Preheating of the streams to a temperature between about 1500° F. and about 2300° F. and then mixing the fuel gas into the combustion air in relatively small increments will result in flameless combustion. The increments in which the fuel gas is mixed with the combustion gas stream preferably result in about a 20 to 200° F. temperature rise in the combustion gas stream due to the combustion of the fuel.

Figure 1:
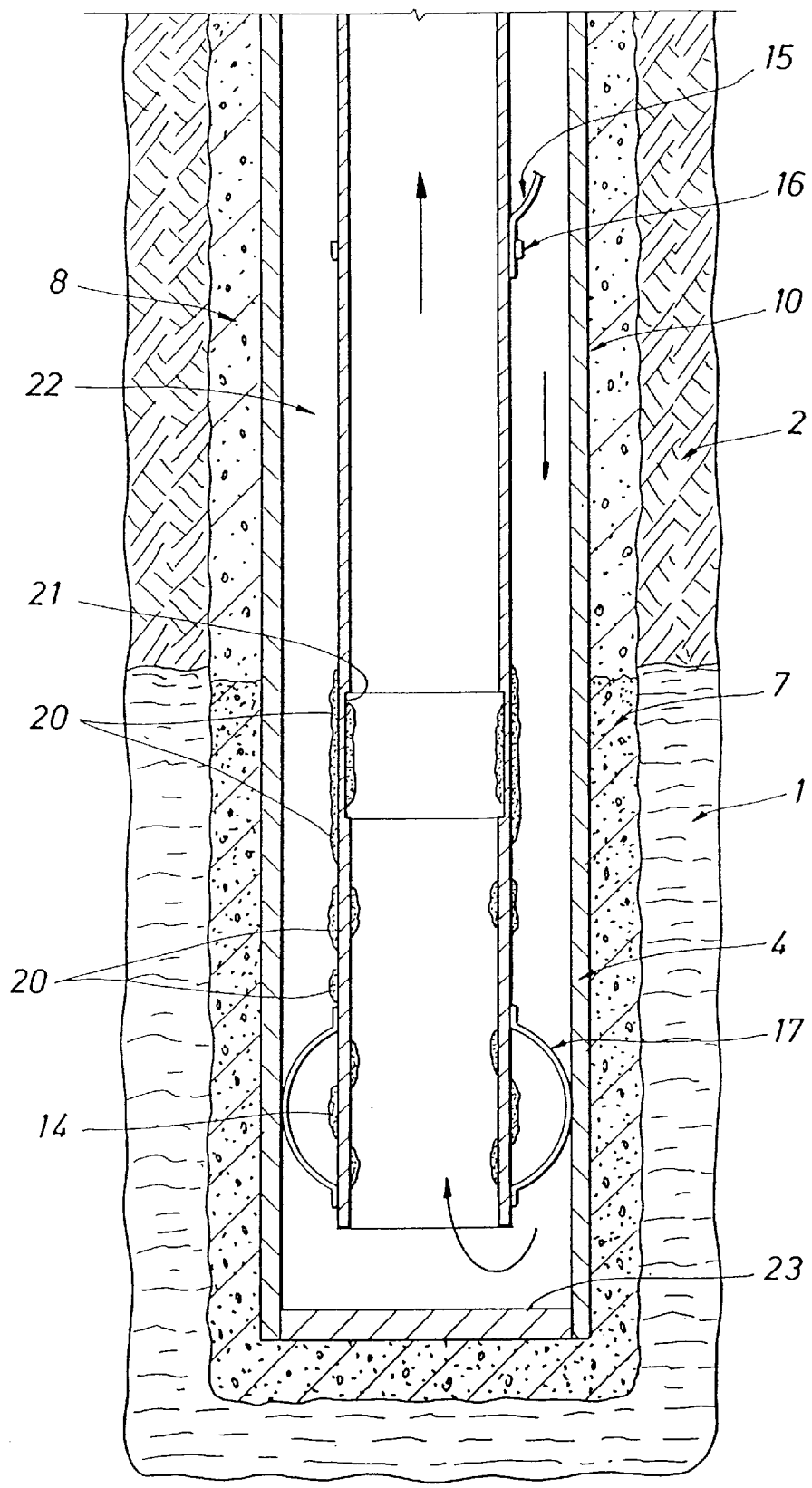
FIG. 1 shows a combustor suitable for use in the present invention.

Referring to FIG. 1, a heat injection well and combustor capable of carrying out the present invention are shown. A formation to be heated, 1, is below an overburden, 2. A wellbore, 3, extends through the overburden and to a position in or near the bottom of the formation to be heated. A vertical well is shown, but the wellbore could be deviated or horizontal. Horizontal heat injector wells may be provided in formations that fracture horizontally to recover hydrocarbons by a parallel drive process. Shallow oil shale formations are examples of such formations. Horizontal heaters may also effectively be used in thin beds to limit heat loss to overburden and base rock. In the embodiment shown in FIG. 1, the wellbore is cased with a casing, 4. The lower portion of the wellbore may be cemented with a cement, 7, having characteristics suitable for withstanding elevated temperatures and transferring heat. A cement which is a good thermal insulator, 8, is preferred for the upper portion of the wellbore to prevent heat loss from the system. An oxidant conduit, 10, extends from the wellhead (not shown) to the lower portion of the wellbore. A fuel conduit, 12, also extends from the wellhead to the bottom of the wellbore. The fuel conduit defines a fuel volume within the fuel conduit. The fuel volume is in communication with a fuel supply, and is in communication with a combustion chamber surrounding the fuel conduit through a plurality of orifices.

High temperature cements suitable for cementing casing and conduits within the high temperature portions of the wellbore are available. Examples are disclosed in U.S. Pat. Nos. 3,507,332 and 3,180,748. Alumina contents above about 50 percent by weight based on cements slurry solids are preferred.

In shallow formations, it may be advantageous to hammer-drill the heater directly into the formation. When the heater is hammer-drilled directly into the formation, cementing of the heater in the formation is may not be required, but an upper portion of the heater may be cemented to prevent fluid loss to the surface.

Choice of a diameter of the casing, 4, in the embodiment of FIG. 1 is a trade off between the expense of the casing, and the rate at which heat may be transferred into the formation. The casing, due to the metallurgy required, is generally the most expensive component of the injection well. The heat that can be transferred into the formation increases significantly with increasing casing diameter. A casing of between about 4 and about 8 inches in internal diameter will typically provide an optimum trade-off between initial cost and heat transfer.

The fuel gas conduit contains a plurality of orifices, 13, (eight shown) along the length of the conduit within the formation to be heated. The orifices are separated by an interval distance that is sufficient to allow both significant reaction of the oxidant and fuel between orifices, and removal of heat from the heater along the length of the combustion chamber between the orifices. The orifices provide communication between the volume defined by the fuel conduit and the axial combustion chamber. A plurality of orifices provide for distribution of heat release within the formation to be heated. Staging release of fuel into the oxidant/combustion product stream results in staged generation of heat, and with uniform transfer of heat from the wellbore as in the embodiment of FIG. 1, temperatures within the wellbore are well below adiabatic combustion temperatures. Avoiding high temperatures significantly reduces metallurgical requirements, and thus cost of the facility. Additionally, temperatures well below adiabatic combustion temperatures avoids creation of $NO_x$s.

The orifices are sized to accomplish a nearly even temperature distribution within the casing. A nearly even temperature profile within the casing results in more uniform heat distribution within the formation to be heated. A nearly uniform heat distribution within the formation will result in more efficient utilization of heat in a conductive heating hydrocarbon recovery process. A more even temperature profile will also result in lower maximum temperatures for the same heat release. Because the materials of construction of the burner and well system dictate the maximum temperatures, even temperature profiles will increase the heat release possible for the same materials of construction. The number of orifices is limited only by size of orifices which are to be used. If more orifices are used, they must generally be of a smaller size. Smaller orifices will plug more easily than larger orifices. The number of orifices is a trade-off between evenness of the temperature profile and the possibility of plugging.

The number, size, and spacing of the orifices along with the heat removal from the combustion chamber are preferably such that the maximum temperatures within the combustor are less than about 2000° F. This results in long service lives for commercially available materials.

It is important in the operation of a combustor of the present invention that heat be removed from the combustion chamber between fuel orifices. In the application of the present invention to a wellbore heat injector, heat is transferred to the formation around the wellbore. The heater of the present invention could also be used in other applications, such as steam generation and chemical industry or refinery process heaters.

Alternatively, air and/or another oxidant could be staged into fuel by providing orifices in the combustion air conduit instead of the fuel conduit.

Fuel and oxidant transported to bottom of the wellbore combine and react within the wellbore volume surrounding the conduits, 14, forming combustion products. This volume is the axial combustion chamber of the present invention. The combustion products travel up the wellbore and out an exhaust vent at the wellhead. The combustion products may be treated to remove pollutants, and energy recovery from the combustion products by an expander turbine or heat exchanger may also be desirable.

As the combustion products rise in the wellbore above the formation being heated, heat is exchanged between the oxidant and the fuel traveling down the flow conduits and the combustion products. This heat exchange not only conserves energy, but permits the desirable flameless combustion of the present invention. The fuel and the oxidant are preheated as they travel down the respective flow conduits sufficiently that the mixture of the two streams at the ultimate mixing point is at a temperature above the autoignition temperature of the mixture. Flameless combustion results, avoiding a flame as a radiant heat source. Heat is therefore transferred from the wellbore in an essentially uniform fashion.

An electrical lead 15 can be connected with a clamp 16 or other connection to the fuel line 12 near the wellhead below an electrically insulating coupling to supply electrical energy for initial heating and start-up of the combustor. Electrical ground can be provided near the bottom of the borehole with one or more electrically conducting centralizers around the fuel conduit 17 and around the oxidant 18. Centralizers on the fuel conduit above the electrically grounding centralizers are electrically insulating centralizers. Wall thickness of the fuel conduits are preferably decreased in the vicinity of the orifices so that application of electrical energy to the fuel gas conduit results in negligible resistance heating above the orifices, and significant heating below the orifices. Sufficient heat is preferably applied to result in fuel exiting the orifices into a flowing oxidant (or air) stream being at or above the autoignition temperature of the fuel-oxidant mixture as the fuel mixes with the oxidant. Most preferably, the mixture of fuel and oxidant is above the autoignition temperature of the mixture at these start-up conditions. Thus, the fuel would ignite when it passes through the orifices and mix with oxidant between orifices.

Autoignition temperature of the fuel-oxidant mixture is preferably lowered by provision of a catalytic surface 19 in the vicinity of the orifices. This catalytic surface is preferably provided on the inside surface of the oxidant conduit 10. Alternatively, either the fuel conduit could be provided with such a surface, or a tubular or catalyst containing surface could be separately placed within the oxidant conduit. Other catalytic surfaces could be provided, for example in the combustion product annulus outside of the oxidant conduit. This additional catalytic surface could ensure that complete combustion occurred within the wellbore. The catalytic surface can also significantly increase the temperature range within which the combustor can operate by decreasing the temperature at which oxidation of the fuel occurs.

Start-up of the flameless combustor of the present invention can be further enhanced by provision of supplemental oxidants during the start-up phase, and/or by use of a fuel that has a lower catalyzed autoignition temperature such as, for example, hydrogen. Preferred oxidants include supplemental oxygen and nitrous oxide. Hydrogen could be provided along with a natural gas stream, and could be provided as shift gas, with carbon monoxide present and/or carbon dioxide present. Presence of carbon dioxide would not be preferable, but may be tolerable and removal of some carbon dioxide may not be economically justifiable.

Acceptable catalyst materials include noble metals, semi-precious metals, and transition metal oxides. Generally, known oxidation catalysts are useful in the present invention. Mixtures of such metals or metal oxides could also be useful.

Start-up oxidants and/or fuels are preferably only used until the combustor has been heated to a temperature sufficient to enable operation with methane (natural gas) as fuel and air as the oxidant (i.e., the combustor has heated to a temperature above the autoignition temperature of methane in air).

The preheating of fuel gases such as methane to obtain flameless combustion could result in significant generation of carbon within the fuel conduit unless a carbon formation suppressant is included in the fuel stream. The carbon formation suppressant may be carbon dioxide, steam, hydrogen or mixtures thereof. Carbon dioxide and steam are preferred due to the generally higher cost of hydrogen.

Flameless combustion generally occurs when a reaction between an oxidant stream and a fuel is not limited by mixing and the mixed stream is at a temperature higher than the autoignition temperature of the mixed stream. This is accomplished by avoiding high temperatures at the point of mixing and by mixing relatively small increments of fuel into the oxidant containing stream. The existence of flame is evidenced by an illuminate interface between unburned fuel and the combustion products. To avoid the creation of a flame, the fuel and the oxidant are preferably heated to a temperature of between about 1500° F. and about 2300° F. prior to mixing. The fuel is preferably mixed with the oxidant stream in relatively small increments to enable more rapid mixing. For example, enough fuel may be added in an increment to enable combustion to raise the temperature of the stream by about 50 to about 100° F.

Use of the fuel conduit as a resistance heater to provide initial heat for start-up of the flameless combustor of the present invention is a significant improvement because the fuel conduit is present anyway, will generally be made of an electrically conductive material, and being a relatively thick metal, would be expected to be a reliable heater. Thickness of the fuel conduit can be varied to result in release of heat at preselected segments of the length of the fuel conduit. For example, in a well heat injector application, it may be desirable to electrically heat the lowermost portion of the wellbore in order to ensure ignition of the mixed gas stream and guarantee combustion of the fuel, before exhaust gases are passed back up through the wellbore. Electrical energy can be connected to the fuel conduit at the wellhead, and the fuel conduit supported by an insulating hanger, and kept centralized within the air supply conduit with insulating centralizers. The fuel conduit is then grounded below the segment which is to be used as a heater.

Catalytic metals such as palladium or platinum can be coated, preferably by brush electroplating, onto a surface within the combustion chamber to enhance oxidation of the fuel at lower temperatures. Such catalytic surface has been found to be extremely effective in promoting oxidation of methane in air at temperatures as low as 500° F. This reaction rapidly occurs on the catalyst surface, and generally, gases in the boundary layer adjacent to the catalytic surface quickly become fully reacted. An advantage of having a significant catalytic surface within the combustion chamber is that the temperature range within which the flameless combustor can operate can be significantly increased.

EXAMPLES

A thermal reactor was used to establish temperatures at which oxidation reactions would occur with various combinations of fuels, oxidants and catalyst surfaces. The reactor was a one inch stainless steel pipe wrapped with an electrical resistance heating coil, and covered with insulation. A thermocouple for temperature control was placed underneath the insulation adjacent to the outer surface of the pipe. Thermocouples were also provided inside the pipe at the inlet, at the middle, and at the outlet. Test ribbons of noble metals or stainless steel strips with noble metal coatings were hung in the pipe to test catalytic activity. Air preheated to a temperature somewhat below the desired temperature of the test was injected into the electrically heated test section of the pipe. Electrical power to the electrical resistance heater was varied until the desired temperature in the test section was obtained and a steady state, as measured by the thermocouples mounted inside the pipe, was achieved. Fuel was then injected through a mixing tee into the stream of preheated air and allowed to flow into the electrically heated test section. Four platinum ribbons one eighth of an inch wide and about sixteen inches long or a stainless steal strip three eighths of an inch wide and about one sixteenth of an inch thick and about sixteen inches long coated on both sides with either platinum or palladium were suspended within the pipe to test catalytic activity. When the test section contained a catalyst coated strep or ribbon of noble metal and was at or above the catalyzed autoignition temperature, the addition of fuel caused a temperature increase at the inside middle and outlet thermocouples. Below the catalyzed autoignition temperature, such a temperature was not observed. When no catalytic coated strips or noble metal ribbons were present, the test section had to be heated to the autoignition temperature of the fuel before a temperature increase was observed. The non-catalyzed and catalyzed autoignition temperatures as measured are summarized in the TABLE, with the measured non-catalyzed or catalyzed autoignition temperature referred to as the measured autoignition temperature.

different combustion lines were utilized. One combustion line was fabricated from a strip of "HAYNES 120" alloy. The strip was electro brush plated on one side with palladium to an average thickness of $10^{-4}$ inches. The strip was then break formed, swedged and welded in to a ten-foot long pipe with the palladium coating on the inside surface. The other combustion line was a standard three inch pipe of "HAYNES 120" alloy. A "MAXON" burner was used to supply combustion gases to the 10 foot long combustion pipe, and varying amounts of air and/or other additives are mixed with the exhaust from the "MAXON" burner in a mixing section between the burner and the combustion line. To maintain a uniform temperature within the combustion line, three electric heaters, each with its own controller, were placed outside and along the length of the combustion line.

Figure 2:
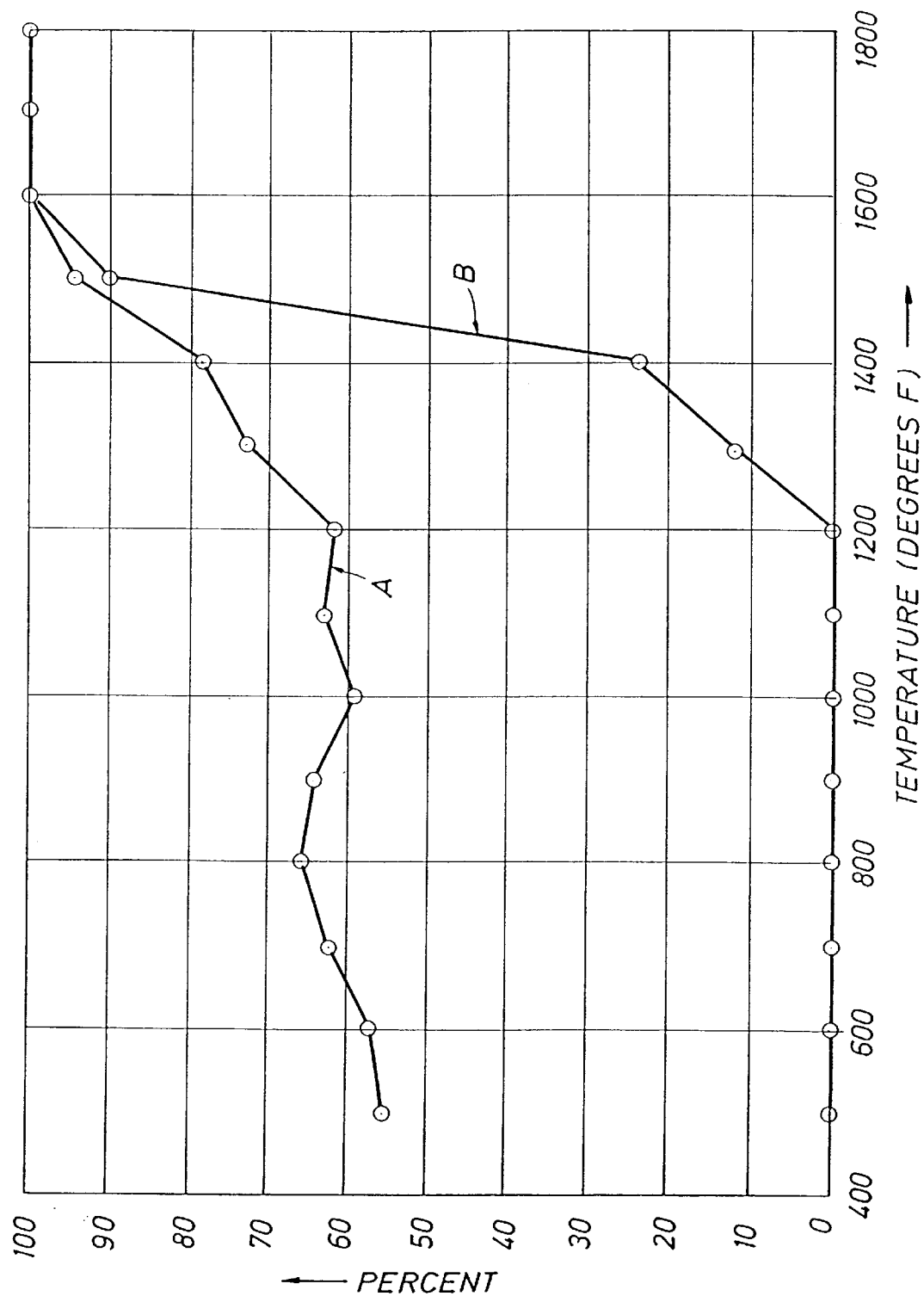
FIG. 2 is a plot of amount of fuel consumed in a burner that demonstrates workability of the present invention vs. temperature.

A series of tests were run, one with the palladium coated combustion line and one with the combustion line that was not palladium coated. Fuel gas was injected through the fuel gas injection port at a rate of 0.374 SCFM, and 220 SCFM of air was injected, including the burner air and the secondary air. Enough fuel gas was provided to the burner to provide a target temperature at the inlet of the combustion line. Percentage of the injected methane that was burned is shown as a function of the combustion line inlet temperature in FIG. 2 for catalyzed configuration (line A) and noncatalyzed configuration (line B). From FIG. 2 it can be seen that at the lowest temperatures at which the apparatus can be operated is about 500° F., 55% of the methane was oxidized

TABLE

| FUEL | MEASURED AUTO-IGNITION TEMP. ° F. | AIR FLOW RATE CC/MIN | FUEL CONC. % OF AIR VOL. % | ACCEL. % OF AIR VOL % | CATALYST |
|---|---|---|---|---|---|
| NAT. GAS | 1450 | 380 | 10.5 | | |
| NAT. GAS | 1350 | 380 | 2.6 | $N_2O/21$ | |
| NAT. GAS | 1251 | 380 | 2.6 | $O_2/40$ | |
| DIMETHYL ETHER | 950 | 380 | 2.6 | | |
| DIMETHYL ETHER | 601 | 380 | 2.6 | $N_2O/21$ | |
| $H_2$ | 1218 | 380 | 13 | | |
| $H_2$ | 120 | 380 | 13 | | Pt |
| 66.6% $H_2$ 33.3% CO | 1249 | 380 | 13 | | |
| 66.6% $H_2$ 33.3% CO | 416 | 380 | 13 | | Pt |
| 66.6% $H_2$ 33.3% CO | 411 | 380 | 13 | $N_2O/44.7$ | Pt |
| 66.6% $H_2$ 33.3% CO | 300 | 0 | 13 | 380CC/MIN 100% $N_2O$ | Pt |
| Methane | 590 | 380 | 13 | — | Pd |
| $H_2$ | 300 | 380 | 13 | — | Pd |
| 66.6% $H_2$ 33.3% CO | 310 | 380 | 13 | — | Pd |

From the TABLE it can be seen that addition of $N_2O$ to the fuel stream greatly reduces the measured autoignition temperature of the mixtures. Further, inclusion of hydrogen as a fuel and presence of the catalytic surface also significantly reduces the dynamic autoignition temperatures.

A ten-foot long test combustor was used to test the results of the one inch reactor in a distributed combustor application. A one-inch od. fuel gas line was provided within a two-inch id. combustion line. The fuel injection line provided a conduit for fuel to a fuel injection port located near an inlet end of the combustion line. The two inch id. combustion line was placed within an insulated pipe, and thermocouple were placed along the fuel supply line. Two with the palladium coated combustion line. The lowest temperature of operation might be somewhat below 500° F. but the equipment available was not capable of operation at lower temperature. When the combustion line without the palladium coating was used, some oxidation of methane occurred at 1300° F., and oxidation of methane occurs rapidly at temperatures of about 1500° F. At temperatures of 1600° F. and above, the presence of the palladium surface has no effect because oxidation of methane is rapid and complete either with or without the palladium surface.

The temperature independence of the methane oxidized below 1300° F. tends to verify that the methane within the boundary layer at the surface of the palladium surface oxidizes rapidly, and that transportation of methane to this boundary layer, and not kinetics, dictates the extent to which methane is oxidized. At temperatures of about 1300° F. and greater, thermal oxidation becomes prevalent, and a temperature dependence is due to this thermal oxidation.

We claim:

1. A flameless combustor comprising:

an axial combustion chamber in communication with an inlet for oxidant at one end and in communication with a combustion product outlet at the other end;

a fuel conduit within the axial combustion chamber, the fuel conduit defining a fuel volume, the fuel volume in communication with a fuel supply, and in communication with the combustion chamber through a plurality of orifices located along the fuel conduit, each of the orifices separated by an interval distance wherein the oxidant can pass through the combustion chamber and mix with fuel passing through the orifices from the fuel volume as the oxidant passes from the inlet end to the combustion product outlet;

a catalytic surface located within the axial combustion chamber, the catalytic surface effective to reduce the autoignition temperature of a mixture of fuel and oxidant from a noncatalyzed autoignition temperature to a catalyzed autoignition temperature; and an electrical power supply effective to pass electrical current through the fuel conduit in an amount effective to heat the fuel conduit in the vicinity of at least one orifice to temperature above a temperature at which the fuel will ignite when the fuel passes through the orifices.

2. The combustor of claim 1 wherein the catalytic surface comprises an outer surface of the fuel conduit.

3. The combustor of claim 1 wherein the catalytic surface comprises an inner surface of the combustion chamber.

4. The combustor of claim 1 wherein the combustion chamber is defined by an inside surface of a tubular within a wellbore.

5. The combustor of claim 1 further comprising a means to remove heat from the interval of the combustion chamber between at least two orifices, the means to remove heat capable of removing an amount of heat that results in the temperature within the combustion chamber being, when in a steady state, greater than the autoignition temperature of the fuel in air, but less than about 2000° F.

6. The combustor of claim 5 wherein the means to remove heat from an interval of the combustion chamber between at least two of the orifices comprises the formation to which heat can be transferred from the combustion chamber by convection and conduction through an annular space surrounding the combustion chamber.

7. The combustor of claim 1 wherein the catalytic surface comprises palladium.

8. The combustor of claim 1 wherein the combustor is within a wellbore.

9. The combustor of claim 8 wherein the fuel conduit is a tubular suspended from a wellhead and the combustor further comprises; a means to apply electrical power to the fuel conduit at the wellhead; and the fuel conduit is of a lesser thickness in the vicinity of the orifices than above the orifices and the fuel conduit is grounded from a point below at least one orifice.

* * * * *